United States Patent
Sinclair et al.

(10) Patent No.: US 6,490,881 B1
(45) Date of Patent: Dec. 10, 2002

(54) GENERATING DISPLACEMENT AND THEROACOUSTIC REFRIGERATOR

(75) Inventors: Robert Henry Sinclair, Pretoria (ZA); Philip Loveday, Midrand (ZA); David Ronald Jones, Basingstoke (GB); Michael Yuri Shatalov, Pretoria (ZA); Frederik A. Koch, Warmbaths (ZA); Jeremy Wallis, Pretoria (ZA); Johannes Nicolaas Bothma, Pretoria (ZA); Jonathan Du Pre Le Roux, Centurion (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 09/743,595

(22) PCT Filed: Jul. 12, 1999

(86) PCT No.: PCT/IB99/01272

§ 371 (c)(1),
(2), (4) Date: Mar. 21, 2001

(87) PCT Pub. No.: WO00/04287

PCT Pub. Date: Jan. 27, 2000

(30) Foreign Application Priority Data

Jul. 14, 1998 (ZA) ............................................. 98/6243

(51) Int. Cl.[7] ................................................. F25B 23/00
(52) U.S. Cl. ............................................ 62/467; 60/545
(58) Field of Search ................................ 62/467; 60/545, 60/533; 92/92, 90

(56) References Cited

U.S. PATENT DOCUMENTS

| | | | |
|---|---|---|---|
| 3,727,418 A | * 4/1973 | Glazier | .......................... 62/45 |
| 3,822,388 A | 7/1974 | Martini et al. | |
| 4,412,430 A | * 11/1983 | Leroy | .......................... 62/467 |
| 4,601,665 A | * 7/1986 | Messmore | ................... 434/267 |
| 5,146,750 A | 9/1992 | Moscrip | |
| 5,270,595 A | * 12/1993 | Wisner | ........................ 310/26 |
| 5,481,152 A | 1/1996 | Buschulte | |
| 5,673,561 A | 10/1997 | Moss | |
| 5,711,153 A | * 1/1998 | Tetro | ........................... 60/583 |

FOREIGN PATENT DOCUMENTS

DE        19643180        4/1997

OTHER PUBLICATIONS

A Search Report which issued in connection with a corresponding PCT patent application. Patent Abstracts of Japan, Publication No. 63169779, Publication Date Jul. 13, 1988.

* cited by examiner

Primary Examiner—Denise L. Esquivel
Assistant Examiner—Malik N. Drake
(74) Attorney, Agent, or Firm—Trexler, Bushnell, Giangiorgi, Blackstone & Marr, Ltd.

(57) ABSTRACT

A displacement generator (10) has a housing (12) defining a chamber (14) containing an incompressible liquid (15). A port (22) of the housing (12) is closed by a movable member (24). Within the chamber (14), opposing, convex, flexible walls (16.1, 16.2) form an internal modulating chamber (18), which optionally contains a compressible gas. Opposed ends of the walls (16.1, 16.2) can be displaced toward and away from each other by a motion transducer, e.g. a stack of ceramic piezoelectric members (20), respectively to pressurize and depressurize the chamber (14) and thus to displace the member (24) to and fro to form an output of the displacement generator.

20 Claims, 2 Drawing Sheets

GENERATING DISPLACEMENT AND THEROACOUSTIC REFRIGERATOR

Figure 1:
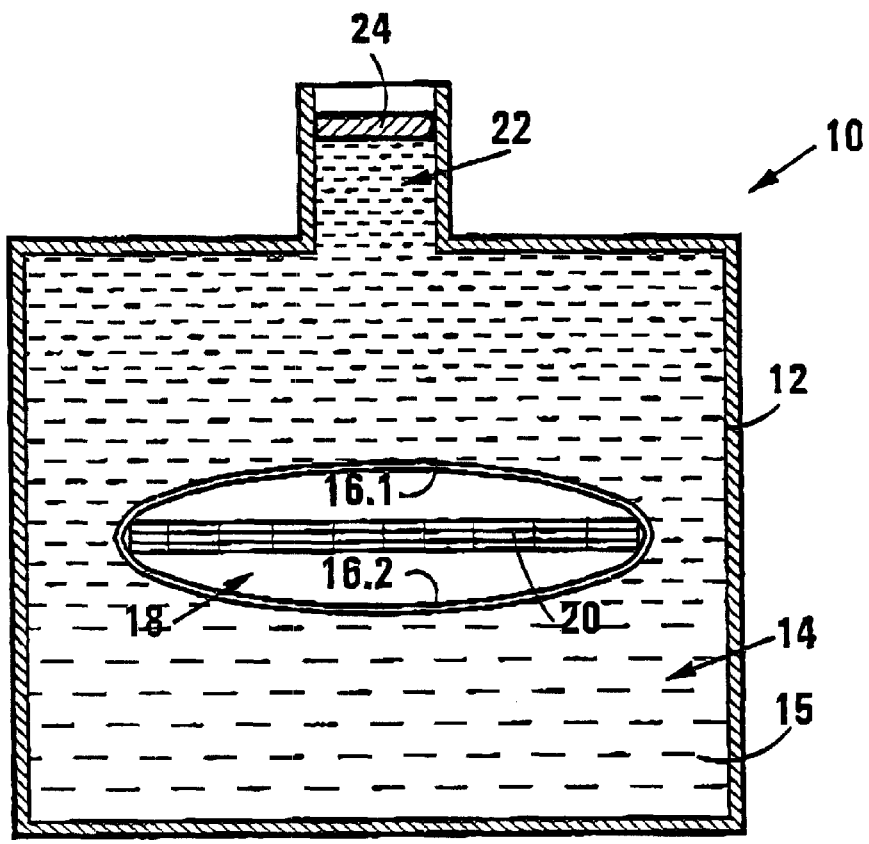

THIS INVENTION relates to a method of generating displacement, to a displacement generator, and to a thermoacoustic refrigerator.

U.S. Pat. No. 5,481,152 in the name of Buschulte discloses a piezoelectric actuator including a hollow body 1 formed as a round tube 2 of piezoelectric material. At least one end of the tube mounts an elastic membrane 10 via an annular carrier member 8. The hollow body forms an enclosed chamber 13 filled with incompressible fluid 14. Operating the piezoelectric element changes the volume of the chamber and causes commensurate deformation of the elastic membrane. In another embodiment, elastic membranes are provided at both ends. In yet another embodiment, two piezoelectric tubes, one received with clearance within the other, form an annular chamber to provide more versatility in the amount of deformation of the elastic membrane which can be achieved.

In accordance with a first aspect of this invention, there is provided a displacement generator which includes

- a housing defining an enclosed chamber, the housing including a port exposed to the chamber;
- at least one flexible wall exposed to the chamber;
- a fluid contained within the chamber;
- a movable member in the port which movable member is exposed to the fluid;
- a motion transducer able to generate motion and being operatively connected to said at least one flexible wall selectively to flex said at least one flexible wall.

In use, when the wall is flexed, the volume of the chamber is changed which causes movement of the fluid through the port which causes commensurate movement of the movable member which acts as a displacement output of the displacement generator.

In one species of embodiment, said at least one flexible wall may be an outer wall of the housing, forming part of an outer boundary of the chamber. Preferably, said at least one flexible wall may be a first flexible wall, the outer wall of the housing providing also an opposing second flexible wall opposite to said first flexible wall, said first and second flexible walls providing an opposing wall pair arranged to flex in opposing directions to increase/decrease a spacing therebetween, said opposing wall pair forming an enclosed actuating chamber which is said enclosed chamber. Further, said fluid may be a relatively incompressible actuating fluid, preferably a liquid, the displacement generator including a modulating chamber surrounding said actuating chamber and a relatively compressible modulating fluid, preferably a gas, at a predetermined pressure, within the modulating chamber, the flexible well pair having outer surfaces opposite to inner surfaces which are exposed to the actuating fluid, the outer surfaces being exposed to the modulating fluid. Appropriate selection of the actuating fluid and the modulating fluid in conjunction with the physical configuration of the device will then allow a desired natural frequency of the device to be obtained.

In another species of embodiment, said at least one flexible wall may be an inner wall within the housing, said housing being an outer housing defining the enclosed chamber, said at least one flexible wall forming an internal wall within the enclosed chamber. Preferably, said at least one flexible wall may be a first flexible wall, the displacement generator including also an opposing second flexible wall opposite to said first flexible wall, said first and second flexible walls providing an opposing wall pair arranged to flex in opposing directions to increase/decrease a spacing therebetween, said opposing wall pair forming an enclosed modulating chamber which is an inner chamber within said enclosed chamber, which is an actuating chamber. Further, said fluid in said actuating chamber may be relatively incompressible, e.g. a liquid, the displacement generator including a modulating fluid e.g. a gas, at a predetermined pressure, which is relatively compressible in said modulating chamber.

Said first and second flexible walls of said flexible wall pair may advantageously be curved, said motion transducer being arranged to displace opposed ends of the flexible wall pair relative to each other to change the curvature of the respective walls thus to cause a relatively large change in volume of the actuating chamber in response to a relatively small displacement of said opposed ends. Thus the motion transducer may be connected in between said opposed ends, the motion transducer being selectively extensible/contractible.

The motion transducer may be selected from the group consisting of an electrostriction device, a magnetostriction device, and a piezoelectric device, Preferably the motion transducer may be in the form of a piezoelectrical ceramic stack extending between the opposed ends.

In accordance with a second aspect of this invention, there is provided a method of generating displacement by a displacement generator which includes

- a housing defining an enclosed chamber, the housing including a port exposed to the chamber;
- at least one flexible wall exposed to the chamber;
- a fluid contained within the chamber;
- a movable member in the port which movable member is exposed to the fluid, the method including actuating a motion transducer which is operatively connected to said at least one flexible wall selectively to flex said at least one flexible wall to change the volume of the chamber to move the movable member.

When said at least one flexible wall is an outer wall of the housing and forms part of an outer boundary of the chamber, and when said at least one flexible wall is a first flexible well, the outer wall of the housing providing also an opposing second flexible wall opposite to said first flexible wall, said first and second flexible walls providing an opposing wall pair forming an enclosed actuating chamber which is said enclosed chamber, the method may include selectively flexing, by means of said motion transducer, said opposing wall pair in opposing directions to increase/decrease a spacing between the first and second flexible walls.

When said fluid is a relatively incompressible actuating fluid, and the displacement generator includes a modulating chamber surrounding said actuating chamber and a relatively compressible modulating fluid within the modulating chamber, the flexible wall pair having inner surfaces which are exposed to the actuating fluid and outer surfaces opposite to the inner surfaces, the outer surfaces being exposed to the modulating fluid, the method may include modulating the change in volume of the actuating chamber by resiliently resisting said change in volume by means of the modulating fluid.

When said at least one flexible wall is an inner wall within the housing, said housing being an outer housing wall defining the enclosed chamber, and when said at least one flexible wall is a first flexible wall, the displacement generator including also an opposing second flexible wall opposite to said first flexible wall, said first and second flexible walls providing an opposing wall pair internally within the enclosed chamber, the opposing well pair being arranged to flax in opposing directions to increase/decrease a spacing therebetween, said opposing wall pair forming an enclosed modulating chamber which is an inner chamber within said enclosed chamber, the enclosed chamber being an actuating chamber, said fluid in said actuating chamber being relatively incompressible, the displacement generator including a modulating fluid which is relatively compressible in said modulating chamber, the method may include modulating the change in volume of the actuating chamber by resiliently resisting said change in volume by means of the modulating fluid.

When said first and second flexible walls of said flexible wall pair are curved, the method may include displacing, by means of said motion transducer, opposed ends of the flexible wall pair relative to each other to change the curvature of the respective walls thus to cause a relatively large change in volume of the actuating chamber in response to a relatively small displacement of said opposing ends.

The motion transducer may be connected in between said opposed ends, actuation of the motion transducer being selectively extending or contracting the motion transducer.

In accordance with a third aspect of this invention, there is provided a thermo-acoustic refrigerator including a resonator and a displacement generator drivingly connected to the resonator, the displacement generator being in accordance with the first aspect of this invention.

Figure 2:
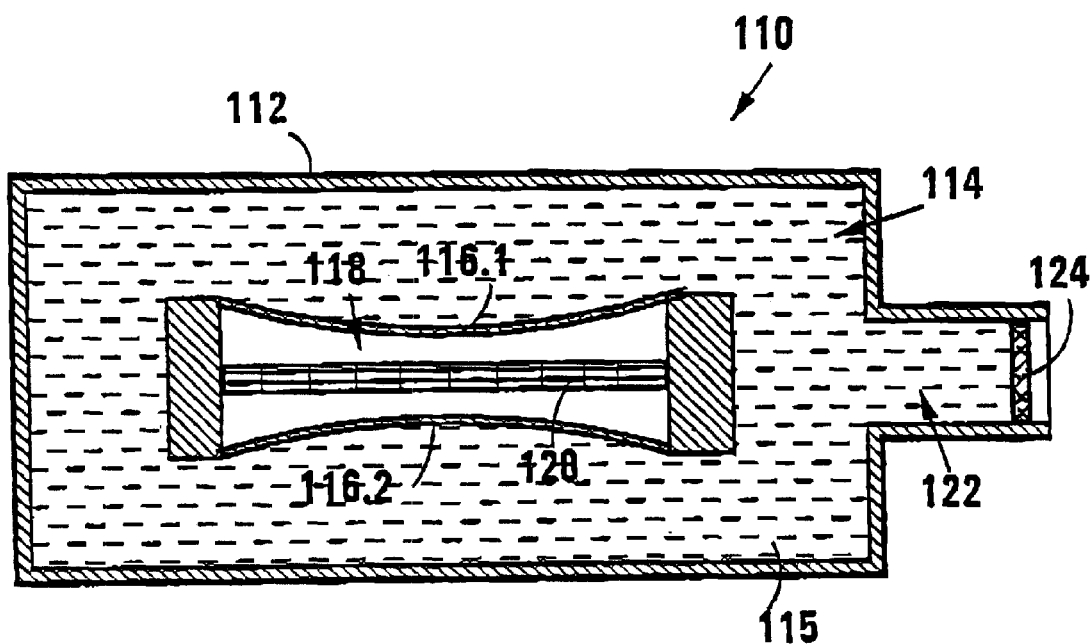
Figure 3:
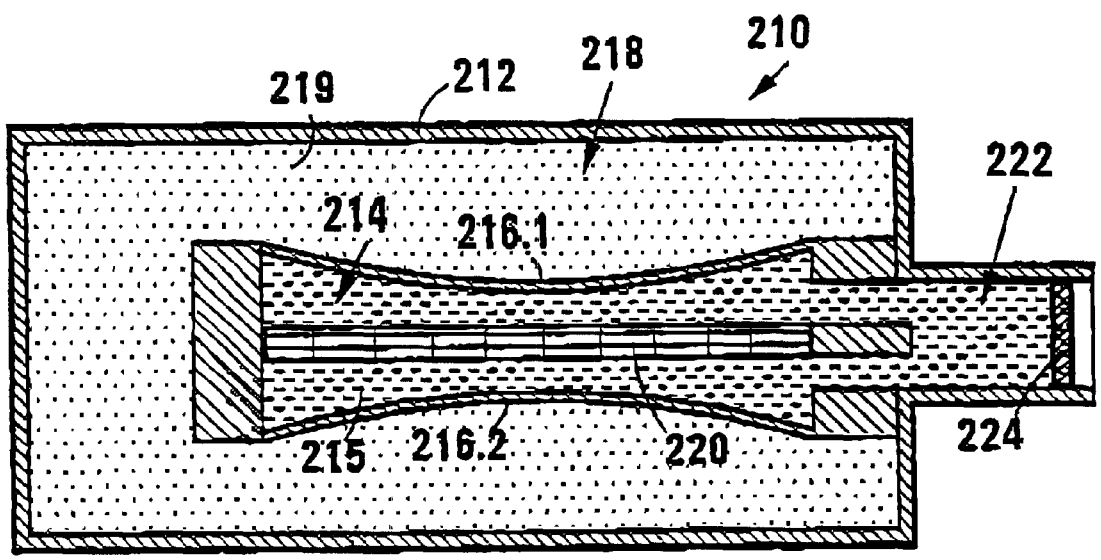
Figure 4:
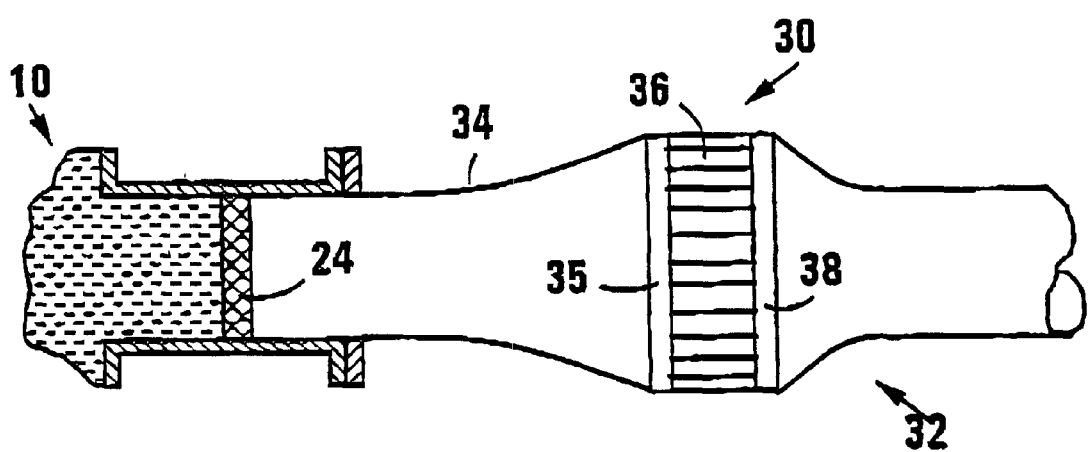

The invention is now described by way of examples with reference to the accompanying diagrammatic drawings. In the drawings FIGS. 1, 2 and 3 show, schematically, in section, three embodiments of displacement generators in accordance with the Invention; and FIG. 4 shows, in axial section, fragmentarily, a thermoacoustic refrigerator in accordance with the invention.

With reference to FIG. 1 of the drawings, a first embodiment of a displacement generator in accordance with the invention is generally indicated by reference numeral 10. It is emphasized that the displacement generator 10 is shown schematically to explain the principles of the invention.

The displacement generator 10 includes a housing 12 defining a chamber 14. The chamber 14 is an actuating chamber and is filled with a relatively incompressible fluid, preferably a liquid, generally indicated by reference numeral 15.

Within the chamber 14, there is provided a pair of opposing flexible walls 16.1 and 16.2 which form internal walls of the housing 12. The flexible walls 16.1 and 16.2 are curved, and oppose each other to form a flexible wall pair in the form of a convex closed figure forming a modulating chamber 18 therebetween.

A ceramic stack 20 in the form of at least one, and in practice a plurality of, elongate piezoelectric members, is connected at ends thereof to and extend between opposing ends of the flexible wall pair 16.1, 16.2. The ends of the stack 20 are connected to ends of the wall pair such that contraction of the stack will cause bulging of the flexible wall pair i.e. will increase the volume of the modulating chamber 18 and will thus decrease the volume of and increase the pressure within the actuating chamber 14. Conversely, extension of the ceramic stack 20 will flatten the flexible wall pair causing the chamber 18 to decrease in volume and will increase the volume of and decrease the pressure in the actuating chamber 14.

The housing 12 defines a port 22 which is closed by means of a displaceable member 24, which may conveniently be in the form of a plunger disc and which is movable along the port 22.

Thus, when the ceramic stack 20 is contracted to bulge to increase the chamber 18 and to increase the pressure in the chamber 14, the liquid 15 flows outwardly through the port 22 and displaces the plunger disc 24 outwardly. Conversely, extension of the ceramic stack 20 flattens the flexible wall pair, decreases the chamber 18, decreases the pressure within the housing 12 and causes the liquid 15 to flow inwardly along the port 22 thus causing ambient pressure externally on the plunger disc 24 to move that inwardly in sympathy with inward movement of the liquid 15.

With reference to FIG. 2, a second embodiment of a displacement generator in accordance with this invention is generally indicated by reference numeral 110, The displacement generator 110 is in many respects similar to the displacement generator 10 of FIG. 1 and like reference numerals refer to like features or components. The FIG. 2 embodiment is not described in detail, and only one difference will be emphasized.

The flexible wall pair 116.1 and 116.2 provides an externally concave body. Thus, in this embodiment, when the ceramic stack 120 contracts, it increases the curvature of the flexible walls 116.1 and 116.2 thus causes the chamber 118 to decrease in volume, which causes the chamber 114 to increase in volume and the pressure to decrease, thus causing return flow of the liquid 115 through the port 122 and thus inward movement of the plunger disc 124.

Conversely, if the ceramic stack 120 extends, the flexible walls 116.1 and 116.2 will flatten causing an increase in the volume of the chamber 118 thus causing flow of liquid 115 outwardly in the port 122.

Thus, in the embodiments of FIGS. 1 and 2, contraction of the piezoelectric stacks cause respectively opposite displacements of the plunger disc.

With reference to FIG. 3, a third embodiment of a displacement generator in accordance with the invention is generally indicated by reference numeral 210. Also the embodiment 210 is similar in many respects to the embodiments of FIGS. 1 and 2 and again like reference numerals are used to denote like components and features. Again the embodiment of FIG. 3 is not described in detail and a single difference is merely emphasized.

In the embodiment of FIG. 3, the chamber within the housing 212 is in fact the modulating chamber 218, and the chamber enclosed between the opposing flexible walls 216.1 and 216.2 is the actuating chamber 214 filled with incompressible liquid 215. The port 222 is in communication with the actuating chamber 214. Thus, in the embodiment of FIG. 3, contraction of the ceramic stack 220 causes an increase in curvature of the flexible walls 216.1 and 216.2 thus decreasing the volume of the chamber 214 and forcing the liquid 215 outwardly in the port 222 thus displacing the displacement member or plunger 224 outwardly.

Conversely, extension of the ceramic stack 220 flattens the flexible walls 216.1 and 216.2 to increase the chamber 214 and to cause pressure externally of the displacement disc 224 to move it and the liquid 215 inwardly in the port 222.

Another important aspect of this invention is described with reference to FIG. 3, but it can also be applied to the embodiments of FIGS. 1 and 2.

The modulating chamber 218 is filled with a compressible gas 219 which will tend to counteract the effect of contraction and extension of the ceramic stack 220. Thus, if the ceramic stack 220 is extended to increase the volume of the chamber 214, that will decrease the volume of the chamber 218 which will pressurize the compressible gas 219. It is to be appreciated that the ratio of compression, in the embodiment of FIG. 3, will be relatively small bearing in mind that the modulating chamber 218 is probably much larger than the actuating chamber 214. Furthermore, it is to be appreciated that the gas 219 is compressible.

When a modulating gas is used with the embodiments of FIGS. 1 and 2, the gas will be contained within the flexible wall pair.

The pressure of the modulating gas is selected in conjunction with the nominal pressure to which the displaceable member is subjected such that, when the device is inoperative but connected to a system it is intended to drive, no or little residual stress is present in the driving system. Thus, the stresses and strains in the driving system will be due to, mostly or exclusively, operation of the driving system itself, as opposed to subjecting the driving system to residual stress and strain and superimposing thereon cyclic stresses and strains due to its operation. Conveniently, the gas can be exposed via a small bleed aperture or orifice to a refrigerator gas of a refrigerator as will be described below, to equalize pressures. In use, the bleed aperture is too small to allow instantaneous equalizing in accordance with pressure fluctuations when the device is in operation.

During designing the displacement generator, a number of options exist to design to a desired natural frequency, for example by selecting the volume of the chamber, the curvature of the flexible wall, and the like. At least some of these may be adjusted to adjust the natural frequency.

It is to be appreciated that a displacement generator can be designed to a specific natural frequency, as mentioned above. In practice, the actual natural frequency may differ from the desired natural frequency.

The development mentioned above, has the advantage of being able to select the relatively incompressible fluid, preferably liquid, and the relatively compressible fluid, preferably gas, in respect of the their physical properties, and also, in the case of the compressible gas, the pressure with which it is present within the modulating chamber 218. Thus, a displacement generator in accordance with the invention can in this fashion be tuned in respect of its natural frequency. This feature is of particular importance if a specific natural frequency or a natural frequency within a narrow range, is required.

With reference to FIG. 4, a thermo-acoustic refrigerator in accordance with a third aspect of this invention is generally indicated by reference numeral 30.

The thermo-acoustic refrigerator 30 comprises, generally, a resonator 32 which is connected to, such as to be driven by, a displacement generator in accordance with the second aspect of the invention and which is generally indicated by reference numeral 10. Thus, the resonator 32 is internally exposed to the external side of the displaceable member of plunger disc 24. For convenience, reference is made to a displacement generator 10 and to a plunger disc 24. It is emphasized that the displacement generator can be any suitable displacement generator in accordance with this invention, for example, any of the displacement generators of FIGS. 1, 2 and 3.

The thermo-acoustic refrigerator further has a hot side reducer 34, a hot side heat exchanger 35, a stack 36 and a cold side heat exchanger 38 in conventional fashion.

The thermo-acoustic refrigerator is operated by selectively applying alternating voltage to the ceramic stack of the displacement generator 10 to vibrate the plunger disc 24 and thus to drive the resonator 32. In this regard, it is to be appreciated that the resonator 32 will have a natural frequency and the natural frequency of the displacement generator is preferably tuned, as described above, to the natural frequency of the resonator 32.

It is a well recognized requirement of thermo-acoustic refrigerators that an electric acoustic transducer or loudspeaker which is conventionally used to drive a thermo-acoustic refrigerator, must be able to drive a high load and that conventional electrodynamic transducers are often unable to generate sufficient displacement under these load conditions. The Applicant is aware that a large amount of effort and funds have been invested in developing electroacoustic transducers or loudspeakers to satisfy these requirements.

The Applicant contends that this invention is a teaching away from conventional thinking in respect of driving a thermo-acoustic refrigerator by piezoelectricity. It is well known that a piezoelectric-effect, for example in a conventional ceramic piezoelectric member as used in the extensional mode, is generally of high force but very small displacement, the displacement being in the micron range rather than in the millimetre range. It is thus very important that, in accordance with this invention, a displacement generator is provided to amplify a small displacement of high force. It is also regarded as very important that the displacement generator in accordance with this invention operates on the basis of causing a relatively large change in volume by means of a relatively small one dimensional change i.e. a change in length. It is further very important that the change in volume is transmitted very effectively to a membrane which can vibrate. It is yet further of importance that the natural frequency of the system can be tuned.

The Inventors believe that this invention improves on other systems in respect of the force-displacement characteristics the displacement generator in accordance of this invention can achieve.

Thus, this invention provides a simple, elegant and effective drive for a thermo-acoustic refrigerator and improves, especially in respect of its force/displacement characteristics, on known systems.

What is claimed is:

1. A displacement generator (10, 110, 210) which includes
a housing (12, 112, 212) defining an enclosed chamber (14, 114, 214), the housing including a port (22, 122, 222) exposed to the chamber;
at least one flexible wall (16.1, 16.2; 116.1, 116.2; 216.1, 216.2) exposed to the chamber and being flexible in a general flex direction;
a fluid (15, 115, 215) contained within the chamber;
a movable member (24, 124, 224) in the port which movable member is exposed to the fluid;
a motion transducer (20, 120, 220) able to generate motion in a motion transducer direction and being operatively connected to said at least one flexible wall selectively to flex said at least one flexible wall, characterized in that
the motion transducer is separate and apart from said flexible wall other than said operative connection to said flexible wall and in that said general flex direction is transverse to said motion transducer direction.

2. A displacement generator as claimed in claim 1 in which said at least one flexible wall is an outer wall of the housing and forms part of an outer boundary of the chamber.

3. A displacement generator as claimed in claim 2 in which said at least one flexible wall is a first flexible wall, the outer wall of the housing providing also an opposing second flexible wall opposite to said first flexible wall, said first and second flexible walls providing an opposing wall pair arranged to flex in opposing directions to increase/decrease a spacing therebetween, said opposing wall pair forming an enclosed actuating chamber which is said enclosed chamber.

4. A method as claimed in claim 3 in which said fluid is a relatively incompressible actuating fluid, the displacement generator including a modulating chamber surrounding said actuating chamber and a relatively compressible modulating fluid within the modulating chamber, the flexible wall pair having outer surfaces opposite to inner surfaces which are exposed to the actuating fluid, the outer surfaces being exposed to the modulating fluid.

5. A displacement generator as claimed in claim 1 in which said at least one flexible wall is an inner wall within the housing, said housing being an outer housing defining the enclosed chamber, said at least one flexible wall forming an internal wall within the enclosed chamber.

6. A displacement generator as claimed in claim 5 in which said at least one flexible wall is a first flexible wall, the displacement generator including also an opposing second flexible wall opposite to said first flexible wall, said first and second flexible walls providing an opposing wall pair arranged to flex in opposing directions to increase/decrease a spacing therebetween, said opposing wall pair forming an enclosed modulating chamber which is an inner chamber within said enclosed chamber, which is an actuating chamber.

7. A displacement generator as claimed in claim 6 in which said fluid in said actuating chamber is relatively incompressible, the displacement generator including a modulating fluid which is relatively compressible in said modulating chamber.

8. A thermo-acoustic refrigerator including a resonator and a displacement generator drivingly connected to the resonator, the displacement generator being in accordance with claim 4 or claim 7, in which a resonant frequency of the displacement generator has been tuned to a resonent frequency of the resonator by suitable selection of at least one of the modulating fluid and a pressure of the modulating fluid in the modulating chamber.

9. A displacement generator as claimed in claim 3 or claim 6 in which said first and second flexible walls of said flexible wall pair are curved, said motion transducer being arranged to displace opposed ends of the flexible wall pair relative to each other to change the curvature of the respective walls thus to cause a relatively large change in volume of the actuating chamber in response to a relatively small displacement of said opposing ends.

10. A displacement generator as claimed in claim 9 in which the motion transducer is connected in between said opposed ends, the motion transducer being selectively extensible/contractible.

11. A displacement generator as claimed in claim 10 in which the motion transducer is selected from the group consisting of an electrostriction device, a magnetostriction device, and a piezoelectric device.

12. A displacement generator as claimed in claim 10 in which the motion transducer is in the form of a piezoelectrical ceramic stack extending between the opposed ends.

13. A thermo-acoustic refrigerator including a resonator and a displacement generator drivingly connected to the resonator, the displacement generator being in accordance with claim 10.

14. A thermo-acoustic refrigerator including a resonator and a displacement generator drivingly connected to the resonator, the displacement generator being in accordance with claim 3 or claim 6.

15. A method of generating displacement by a displacement generator (10, 110, 210) which includes a housing (12, 112, 212) defining an enclosed chamber (14, 114, 214), the housing including a port (22, 122, 222) exposed to the chamber;

at least one flexible wall (16.1, 16.2; 116.1, 116.2; 216.1, 216.2) exposed to the chamber and being flexible in a general flex direction;

a fluid (15, 115, 215) contained within the chamber;

a movable member (24, 124, 224) in the port which movable member is exposed to the fluid;

a motion transducer (20, 120, 220) which is operatively connected to said flexible wall and which is separate and apart from said flexible wall other than said operative connection to said flexible wall;

the method being characterized by actuating said motion transducer to move in a motion transducer direction transverse to said general flex direction selectively to flex said at least one flexible wall to change the volume of the chamber to move the movable member.

16. A method as claimed in claim 15 in which said at least one flexible wall is an outer wall of the housing and forms part of an outer boundary of the chamber, in which said at least one flexible wall is a first flexible wall, the outer wall of the housing providing also an opposing second flexible wall opposite to said first flexible wall, said first and second flexible walls providing an opposing wall pair forming an enclosed actuating chamber which is said enclosed chamber, in which method the motion transducer selectively flexes said opposing wall pair in opposing directions to increase/decrease a spacing between the first and second flexible walls.

17. A method as claimed in claim 16, in which said fluid is a relatively incompressible actuating fluid, the displacement generator including a modulating chamber surrounding said actuating chamber and a relatively compressible modulating fluid within the modulating chamber, the flexible wall pair having inner surfaces which are exposed to the actuating fluid and outer surfaces opposite to the inner surfaces, the outer surfaces being exposed to the modulating fluid, the method including modulating the change in volume of the actuating chamber by resiliently resisting said change in volume by means of the modulating fluid.

18. A method as claimed in claim 15, in which said at least one flexible wall is an inner wall within the housing, said housing being an outer housing wall defining the enclosed chamber, said at least one flexible wall being a first flexible wall, the displacement generator including also an opposing second flexible wall opposite to said first flexible wall, said first and second flexible walls providing an opposing wall pair internally within the enclosed chamber, the opposing wall pair being arranged to flex in opposing directions to increase decrease a spacing therebetween, said opposing wall pair forming an enclosed modulating chamber which is an inner chamber within said enclosed chamber, the enclosed chamber being an actuating chamber, said fluid in said actuating chamber being relatively incompressible, the displacement generator including a modulating fluid which is relatively compressible in said modulating chamber, the method including modulating the change in volume of the actuating chamber by resiliently resisting said change in volume by means of the modulating fluid.

19. A method as claimed in claim 17 or claim 18 in which said first and second flexible walls of said flexible wall pair are curved, the method including displacing, by means of said motion transducer, opposed ends of the flexible wall pair relative to each other to change the curvature of the respective walls thus to cause a relatively large change in volume of the actuating chamber in response to a relatively small displacement of said opposing ends.

20. A method as claimed in claim 19 in which the motion transducer is connected in between said opposed ends, actuation of the motion transducer being selectively extending or contracting the motion transducer.

\* \* \* \* \*